(12) United States Patent
Muse, Jr.

(10) Patent No.: US 9,713,316 B1
(45) Date of Patent: Jul. 25, 2017

(54) CANINE EXCREMENT COLLECTION ASSEMBLY (71) Applicant: Walter Muse, Jr., Austin, TX (US)

(72) Inventor: Walter Muse, Jr., Austin, TX (US)

( * ) Notice: Subject to any disclaimer, the term of this patent is extended or adjusted under 35 U.S.C. 154(b) by 0 days.

(21) Appl. No.: 15/347,515

(22) Filed: Nov. 9, 2016

(51) Int. Cl.
A01K 23/00 (2006.01)

(52) U.S. Cl.
CPC .................................. A01K 23/00 (2013.01)

(58) Field of Classification Search
CPC ..................................................... A01K 23/00
USPC ................................. 119/868, 869, 792, 854
See application file for complete search history.

(56) References Cited

U.S. PATENT DOCUMENTS

| | | | | |
|---|---|---|---|---|
| 4,290,386 A * | 9/1981 | Eiriksson | ............... | A01K 23/00 119/868 |
| 4,969,419 A * | 11/1990 | Fong | ...................... | A01K 23/00 119/868 |
| 5,355,836 A * | 10/1994 | Vallery | ................... | A01K 23/00 119/868 |
| 5,427,059 A * | 6/1995 | Logan | .................... | A01K 23/00 119/792 |
| 5,386,802 A | 2/1996 | Hang-Fu | | |
| 5,813,369 A * | 9/1998 | Fujinaga | ................ | A01K 23/00 119/868 |
| 5,937,795 A * | 8/1999 | Raphael | ................. | A01K 23/00 119/868 |
| 7,044,087 B1 | 5/2006 | Brecheen | | |
| 7,063,046 B1 * | 6/2006 | Lin | ........................ | A01K 21/00 119/854 |
| 7,461,616 B2 | 12/2008 | Tsai | | |
| 7,607,407 B1 * | 10/2009 | Blanch | ................... | A01K 21/00 119/868 |
| 2006/0124076 A1 * | 6/2006 | Tseng | ..................... | A01K 23/00 119/868 |
| 2007/0227466 A1 * | 10/2007 | Tsai | ...................... | A01K 23/00 119/868 |
| 2011/0126779 A1 | 6/2011 | Walls | | |
| 2015/0189859 A1 | 7/2015 | John | | |

* cited by examiner

Primary Examiner — Yvonne Abbott-Lewis (57) ABSTRACT

A canine excrement collection assembly for attachment to a dog includes a harness that comprises a first strap. The first strap has a first end and a second end. The first end is configured to couple to a collar that is positioned around a neck of a dog. A second end of the first strap is positioned on a back of the dog proximate to rear hips of the dog. A panel is reversibly couplable to the second end of the first strap. The panel is flexible. The panel is couplable to the harness such that the panel is positioned on the dog such that the panel is configured to collect feces expelled by the dog.

16 Claims, 5 Drawing Sheets

CANINE EXCREMENT COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to excrement collection assemblies and more particularly pertains to a new excrement collection assembly for attachment to a dog.

BRIEF SUMMARY OF THE INVENTION

An embodiment of the disclosure meets the needs presented above by generally comprising a harness that comprises a first strap. The first strap has a first end and a second end. The first end is configured to couple to a collar that is positioned around a neck of a dog. A second end of the first strap is positioned on a back of the dog proximate to rear hips of the dog. A panel is reversibly couplable to the second end of the first strap. The panel is flexible. The panel is couplable to the harness such that the panel is positioned on the dog such that the panel is configured to collect feces expelled by the dog.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
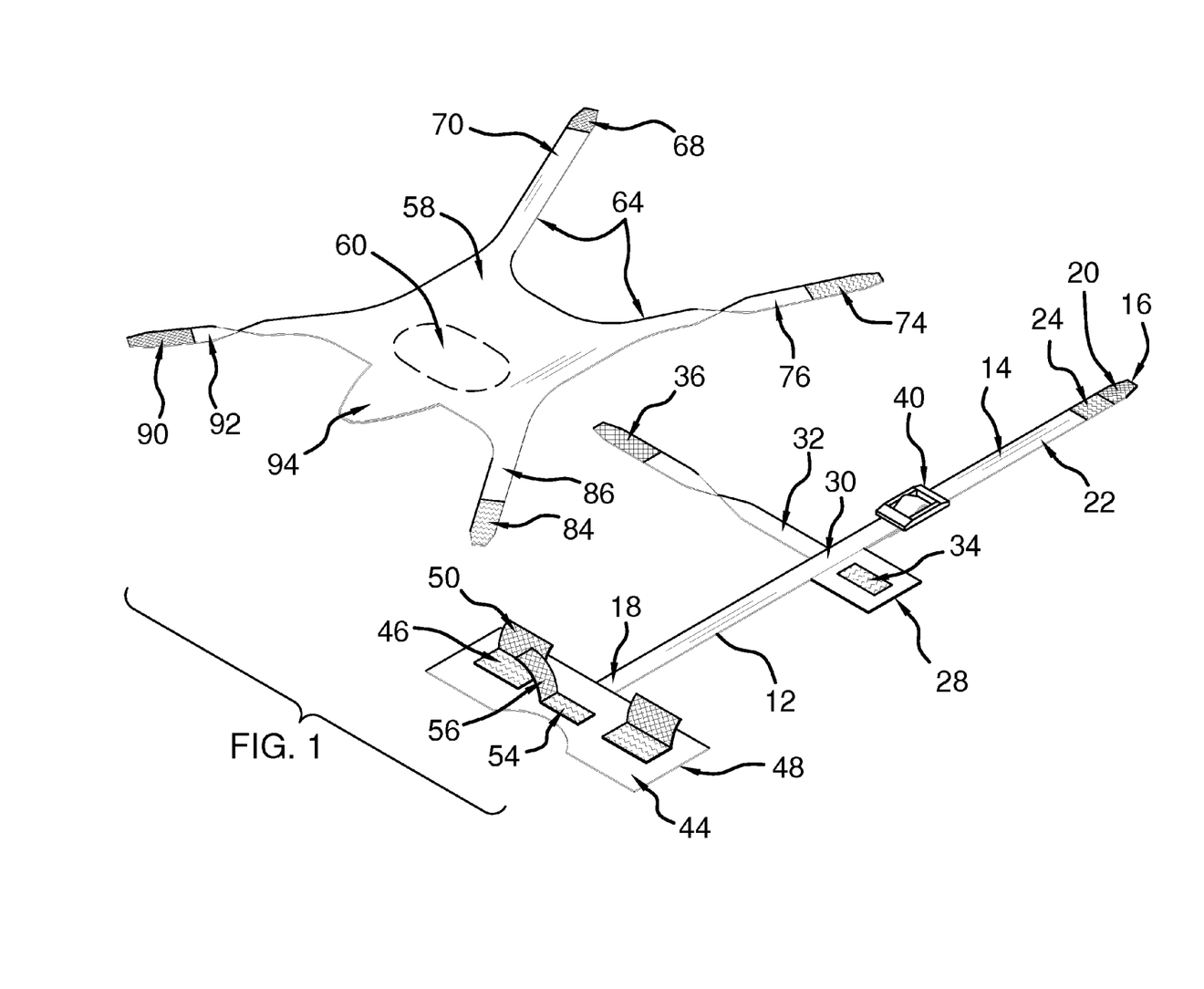
FIG. 1 is an isometric perspective view of a canine excrement collection assembly according to an embodiment of the disclosure.
Figure 2:
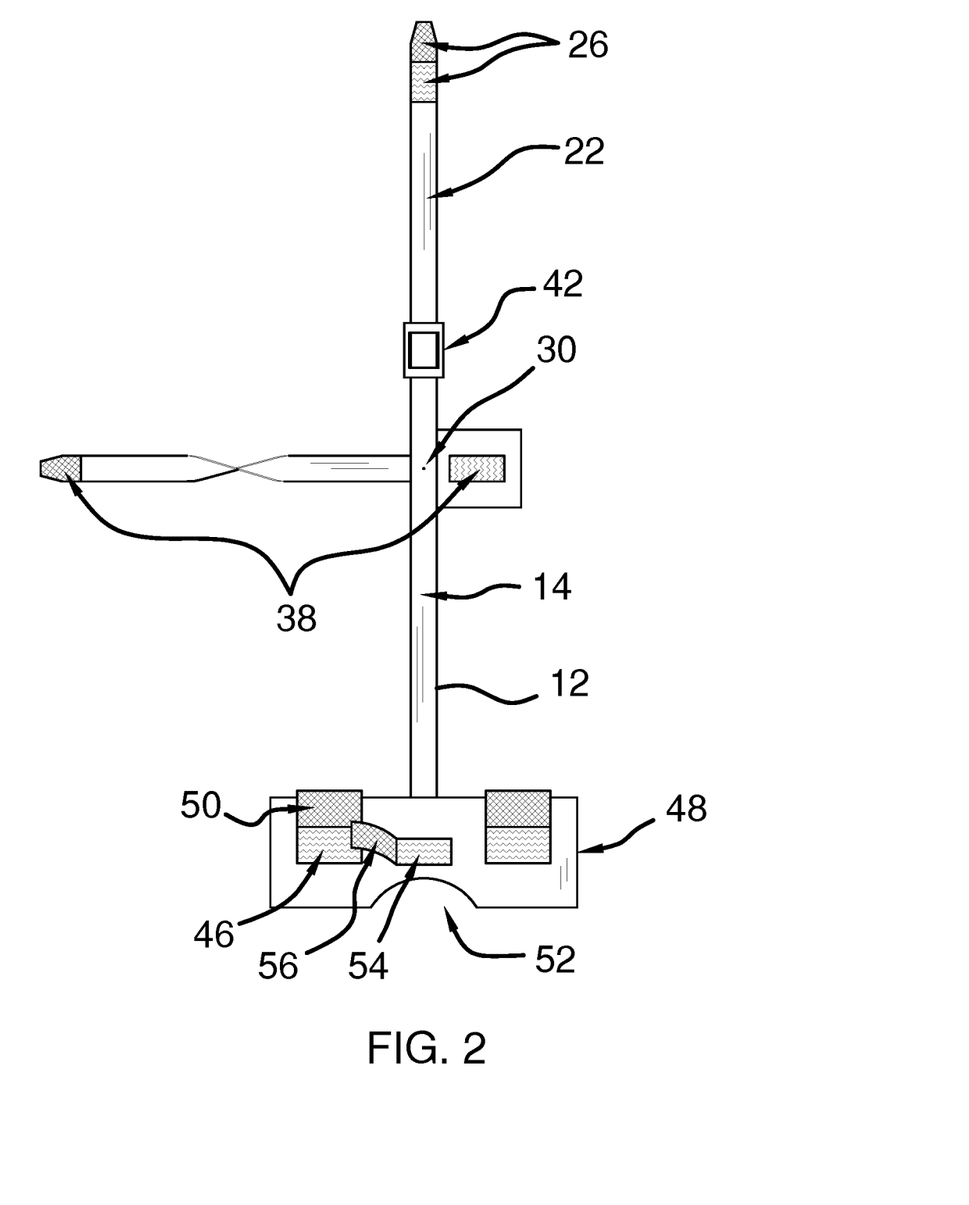
FIG. 2 is a top view of an embodiment of the disclosure.
Figure 3:
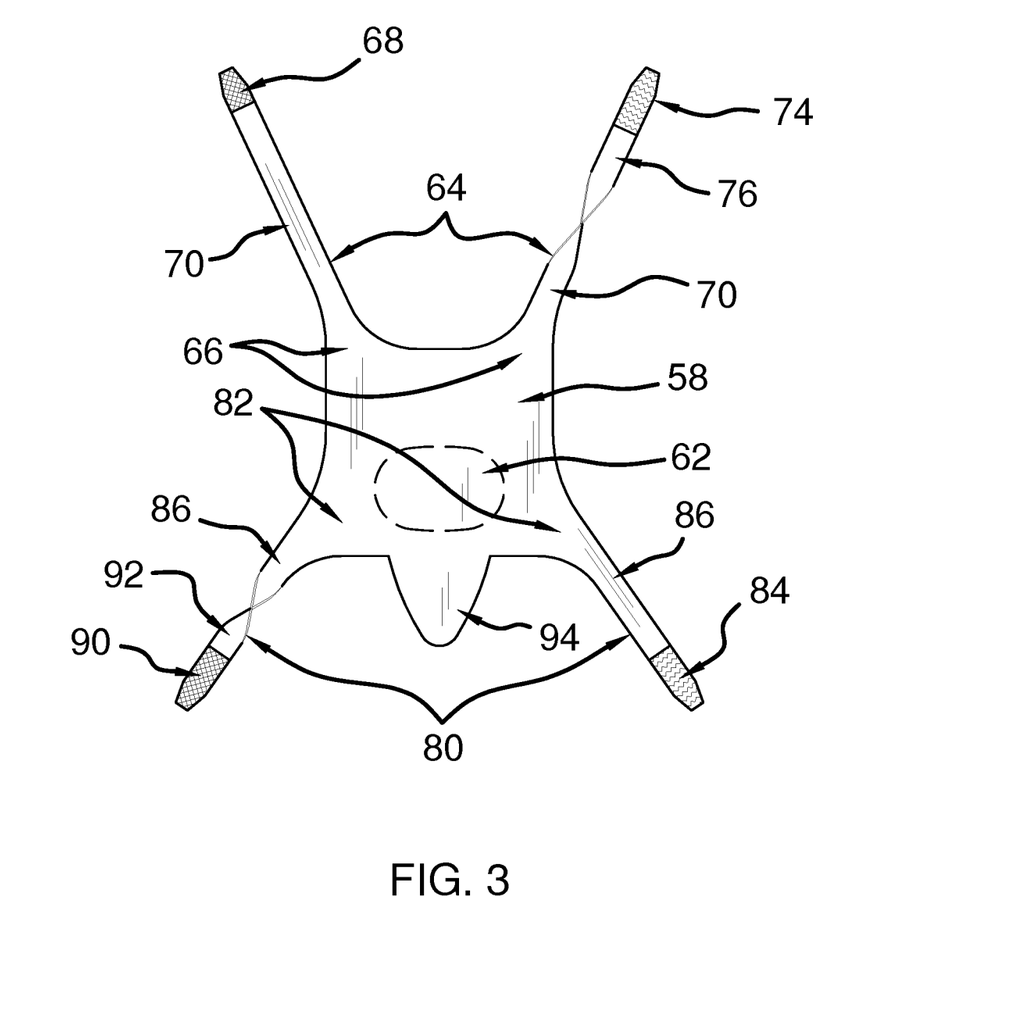
FIG. 3 is a top view of an embodiment of the disclosure.
Figure 4:
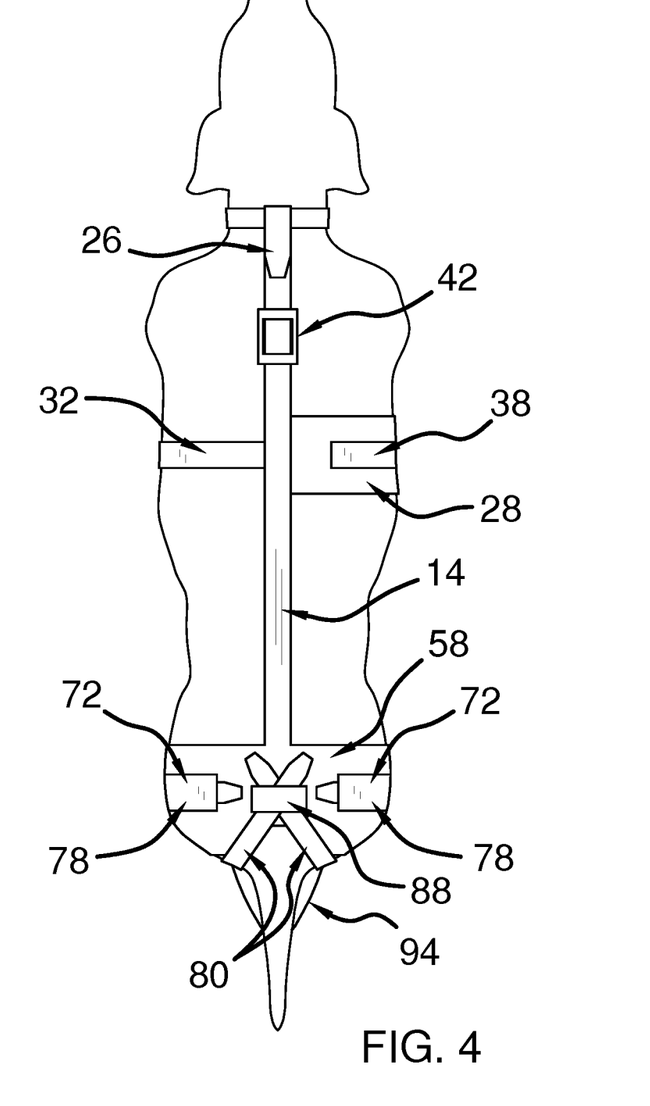
FIG. 4 is an in-use view of an embodiment of the disclosure.
Figure 5:
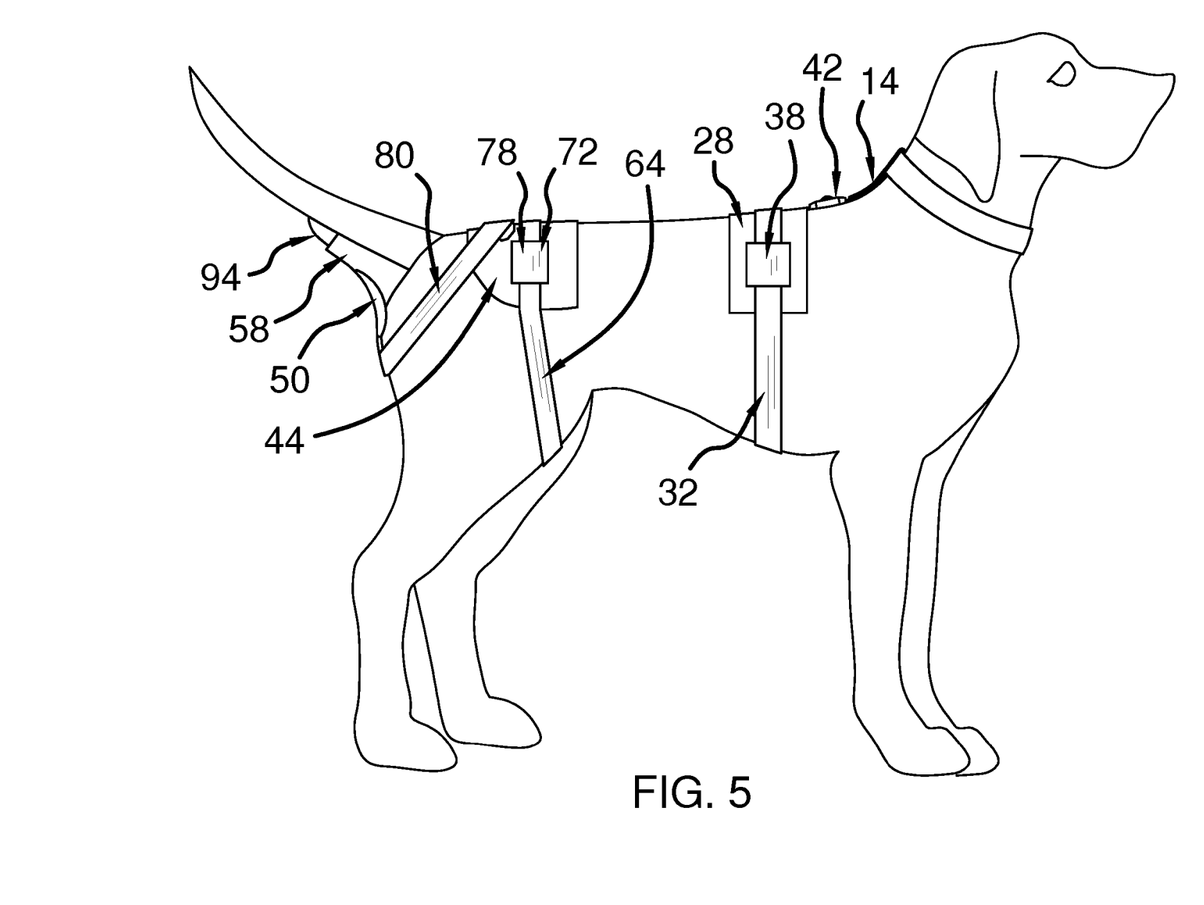
FIG. 5 is an in-use view of an embodiment of the disclosure.

With reference now to the drawings, and in particular to FIGS. 1 through 5 thereof, a new excrement collection assembly embodying the principles and concepts of an embodiment of the disclosure and generally designated by the reference numeral 10 will be described.

As best illustrated in FIGS. 1 through 5, the canine excrement collection assembly 10 generally comprises a harness 12 that comprises a first strap 14. The first strap 14 has a first end 16 and a second end 18. The first end 16 is configured to couple to a collar that is positioned around a neck of a dog. A second end 18 of the first strap 14 is positioned on a back of the dog proximate to rear hips of the dog.

In one embodiment, a first fastener 20 is coupled to a top face 22 of the first strap 14 adjacent to the first end 16. A second fastener 24 is coupled to the top face 22 of the first strap 14 adjacent to the first fastener 20. The second fastener 24 is complementary to the first fastener 20. The first strap 14 is configured to loopedly position around the collar of the dog. The first fastener 20 is positioned to couple to the second fastener 24 such that the first strap 14 is coupled at the first end 16 to the collar. In another embodiment, the first fastener 20 and the second fastener 24 comprise a first hook and loop fastener 26.

In one embodiment, a first flap 28 is coupled to and extends from the first strap 14 proximate to a midpoint 30 of the first strap 14. A second strap 32 is coupled to and extends from the first strap 14. The second strap 32 is opposingly positioned relative to the first flap 28. A first connector 34 is coupled to the first flap 28. A second connector 36 is coupled to the second strap 32 distal from the first strap 14. The second connector 36 is complementary to the first connector 34. The second strap 32 is configured to loopedly position around a chest of the dog. The first connector 34 is positioned to couple to the second connector 36 such that the second strap 32 is coupled to the dog. In another embodiment, the first connector 34 and the second connector 36 comprise a second hook and loop fastener 38.

In one embodiment, an adjuster 40 is coupled to the first strap 14. The adjuster 40 is reversibly couplable to the first strap 14. The adjuster 40 is positioned to selectively couple to the first strap 14 such that the first end 16 of the first strap 14 is selectively positionable relative to the second end 18 of the first strap 14. In another embodiment, the adjuster 40 is positioned between the first flap 28 and the first end 16 of the first strap 14. In yet another embodiment, the adjuster 40 comprises a buckle 42.

A second flap 44 is coupled to the first strap 14 and extends from the second end 18. The second flap 44 is substantially rectangularly shaped. Each of a pair of first couplers 46 is coupled to the second flap 44. Each first coupler 46 is positioned proximate to a respective opposing end 48 of the second flap 44. Each of a pair of second couplers 50 is hingedly is coupled to a respective first coupler 46.

A cutout 52 is positioned in the second flap 44 distal from the first strap 14. The cutout 52 is equally distant from the opposing ends 48 of the second flap 44. The cutout 52 is arcuate. The cutout 52 is positioned in the second flap 44 such that second flap 44 is configured to conform to the rear hips of the dog.

A third coupler 54 is coupled to the second flap 44. The third coupler 54 is positioned between the cutout 52 and the first strap 14. A fourth coupler 56 is hingedly coupled to the third coupler 54.

The assembly 10 comprises a panel 58 that is reversibly couplable to the second end 18 of the first strap 14. The panel 58 is flexible. The panel 58 is couplable to the harness 12 such that the panel 58 is positioned on the dog. The panel 58 is configured to collect feces expelled by the dog. In one embodiment, the panel 58 is substantially rectangularly shaped.

A reservoir 60 is coupled to and positioned in the panel 58. The reservoir 60 is positioned in the panel 58 such that the reservoir 60 is configured to receive the feces excreted from the dog. In one embodiment, the reservoir 60 comprises an insert 62 that is positioned in the panel 58. The insert 62 is resilient. In another embodiment, the insert 62 is ovally shaped.

A pair of third straps 64 is coupled to the panel 58 and extend singly from front corners 66 of the panel 58. The third straps 64 are positioned on the panel 58 such that the third straps 64 are configured to loopedly position around a torso of the dog proximate to the rear hips.

Each of a pair of first retainers 68 is coupled to an inside face 70 of a respective third strap 64 distal from the panel 58. The first retainers 68 are complementary to the first couplers 46. The first retainers 68 are positioned to couple to the first couplers 46 to loopedly couple the third straps 64 around the torso of the dog. In one embodiment, each first retainer 68 and an associated first coupler 46 comprise a third hook and loop fastener 72.

Each of a pair of third retainers 74 is coupled to an outside face 76 of a respective third strap 64 distal from the panel 58. The third retainers 74 are complementary to the second couplers 50. The second couplers 50 are positioned to couple to the third retainers 74 to couple the third straps 64 to the panel 58. In one embodiment, each second coupler 50 and an associated third retainer 74 comprise a fifth hook and loop fastener 78.

A pair of fourth straps 80 is coupled to the panel 58 and extend singly from rear corners 82 of the panel 58. Each of a pair of second retainers 84 is coupled to an upper face 86 of a respective fourth strap 80 distal from the panel 58. The second retainers 84 are complementary to the third coupler 54. In one embodiment, a respective said second retainer 84 and said third coupler 54 comprise a fourth hook and loop fastener 88.

Each of a pair of fourth retainers 90 is coupled to a lower face 92 of a respective fourth strap 80 distal from the panel 58. The fourth retainers 90 are complementary to the second retainers 84 and the fourth coupler 56. The third coupler 54 is configured to selectively couple to a respective second retainer 84 to couple an associated fourth strap 80 across a rump of the dog to the panel 58. A respective fourth retainer 90 that is positioned on the associated fourth strap 80 is positioned to couple to a respective second retainer 84 that is positioned on a respective fourth strap 80. The fourth straps 80 are crossedly configured around a tail of the dog. The respective fourth retainer 90 is positioned to couple to the fourth coupler 56 to couple the fourth straps 80 to the panel 58.

A guide 94 is coupled to and extends from the panel 58. The guide 94 is substantially rigid. The guide 94 is positioned equally distant from the rear corners 82 of the panel 58. The guide 94 is positioned on the panel 58 such that the guide 94 is configured to direct feces to the reservoir 60. In one embodiment, the guide 94 comprises cardboard.

In use, the first fastener 20 is positioned to couple to the second fastener such that the first strap 14 is coupled at the first end 16 to the collar. The second strap 32 is configured to loopedly position around the chest of the dog. The first connector 34 is positioned to couple to the second connector 36 such that the second strap 32 is coupled to the dog. The adjuster 40 is positioned to selectively couple to the first strap 14 such that the first end 16 of the first strap 14 is selectively positionable relative to the second end 18 of the first strap 14. The first retainers 68 are positioned to couple to the first couplers 46 to loopedly couple the third straps 64 around the torso of the dog. The second couplers 50 are positioned to couple to the third retainers 74 to couple the third straps 64 to the panel 58. The third coupler 54 is positioned to selectively couple to a respective second retainer 84 to couple an associated fourth strap 80 across the rump of the dog to the panel 58. A respective fourth retainer 90 that is positioned on the respective fourth strap 80 is positioned to couple to a respective second retainer 84 that is positioned on a respective fourth strap 80. A such, the fourth straps 80 are crossedly configured around the tail of the dog. The respective fourth retainer 90 is positioned to couple to the fourth coupler 56 to couple the fourth straps 80 to the panel 58. The panel 58 is positioned on the dog such that the panel 58 is configured to collect the feces expelled by the dog. The reservoir 60 is configured to receive the feces excreted from the dog. The guide 94 is configured to direct the feces to the reservoir 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A canine excrement collection assembly comprising:
   a harness comprising a first strap having a first end and a second end, said first end being configured for coupling to a collar positioned around a neck of a dog such that a second end of said first strap is positioned on a back of the dog proximate to rear hips of the dog;

a panel reversibly couplable to said second end of said first strap, said panel being flexible;

wherein said panel is couplable to said harness such that said panel is positioned on the dog such that said panel is configured for collection of feces expelled by the dog;

a first flap coupled to and extending from said first strap proximate to a midpoint of said first strap;

a second strap coupled to and extending from said first strap, said second strap being opposingly positioned to said first flap;

a first connector coupled to said first flap;

a second connector coupled to said second strap distal from said first strap, said second connector being complementary to said first connector; and wherein said second strap is configured for loopedly positioning around a chest of the dog, wherein said first connector is positioned on said second strap such that said first connector is positioned to couple to said second connector such that said second strap is coupled to the dog.

2. The assembly of claim 1, further comprising:

a first fastener coupled to a top face of said first strap adjacent to said first end;

a second fastener coupled to said top face of said first strap adjacent to said first fastener, said second fastener being complementary to said first fastener; and wherein said first strap is configured for loopedly positioning around the collar of the dog, wherein said first fastener is positioned on said first strap such that said first fastener is positioned to couple to said second fastener such that said first strap is coupled at said first end to the collar.

3. The assembly of claim 2, further including said first fastener and said second fastener comprising a first hook and loop fastener.

4. The assembly of claim 1, further including said first connector and said second connector comprising a second hook and loop fastener.

5. The assembly of claim 1, further including an adjuster coupled to said first strap, said adjuster being reversibly couplable to said first strap, wherein said adjuster is positioned on said first strap such that said adjuster is positioned to selectively couple to said first strap such that said first end of said first strap is selectively positionable relative to said second end of said first strap.

6. The assembly of claim 5, further including said adjuster being positioned between said first flap and said first end of said first strap, said adjuster comprising a buckle.

7. The assembly of claim 1, further comprising:

a second flap coupled to said first strap and extending from said second end, said second flap being substantially rectangularly shaped;

a pair of first couplers coupled to said second flap, each said first coupler being positioned proximate to a respective opposing end of said second flap;

a cutout positioned in said second flap distal from said first strap, said cutout being equally distant from said opposing ends of said second flap, said cutout being arcuate;

a third coupler coupled to said second flap, said third coupler being positioned between said cutout and said first strap; and wherein said cutout is positioned in said second flap such that second flap is configured for conforming to the rear hips of the dog.

8. The assembly of claim 7, further comprising:

said panel being substantially rectangularly shaped;

a reservoir coupled to and positioned in said panel; and wherein said reservoir is positioned in said panel such that said reservoir is configured for receiving feces excreted from the dog.

9. The assembly of claim 8, further comprising said reservoir comprising an insert positioned in said panel, said insert being resilient, said insert being ovally shaped.

10. The assembly of claim 8, further comprising:

a pair of third straps coupled to said panel and extending singly from front corners of said panel, wherein said third straps are positioned on said panel such that said third straps are configured for loopedly positioning around a torso of the dog proximate to the rear hips;

a pair of first retainers, each said first retainer being coupled to an inside face of a respective said third strap distal from said panel, said first retainers being complementary to said first couplers;

a pair of fourth straps coupled to said panel and extending singly from rear corners of said panel;

a pair of second retainers, each said second retainer being coupled to an upper face of a respective said fourth strap distal from said panel, said second retainers being complementary to said third coupler; and wherein said third coupler is positioned on said panel such that said third coupler is positioned to selectively couple to a respective said second retainer to couple an associated said fourth strap across a rump of the dog to said panel, wherein said first retainers are positioned on said third straps such that said first retainers are positioned to couple to said first couplers to loopedly couple said third straps around the torso of the dog.

11. The assembly of claim 10, further including each said first retainer and an associated said first coupler comprising a third hook and loop fastener, a respective said second retainer and said third coupler comprising a fourth hook and loop fastener.

12. The assembly of claim 10, further comprising:

a pair of second couplers, each said second coupler being hingedly coupled to a respective said first coupler;

a pair of third retainers, each said third retainer being coupled to an outside face of a respective said third strap distal from said panel, said third retainers being complementary to said second couplers;

a fourth coupler hingedly coupled to said third coupler;

a pair of fourth retainers, each said fourth retainer being coupled to a lower face of a respective said fourth strap distal from said panel, said fourth retainers being complementary to said second retainers and said fourth coupler; and wherein a respective said fourth retainer positioned on said respective said fourth strap is positioned to couple to a respective said second retainer positioned on a respective said fourth strap such that said fourth straps are crossedly configured around a tail of the dog, and wherein said respective said fourth retainer is positioned to couple to said fourth coupler to couple said fourth straps to said panel, wherein said second couplers are positioned on said panel such that said second couplers are positioned to couple to said third retainers to couple said third straps to said panel.

13. The assembly of claim 12, further including each said second coupler and an associated said third retainer comprising a fifth hook and loop fastener.

14. The assembly of claim 10, further including a guide coupled to and extending from said panel, said guide being substantially rigid, said guide being positioned equally distant from said rear corners of said panel, wherein said guide is positioned on said panel such that said guide is configured to direct feces to said reservoir.

15. The assembly of claim 14, further including said guide comprising cardboard.

16. A canine excrement collection assembly comprising:
a harness comprising a first strap having a first end and a second end, said first end being configured for coupling to a collar positioned around a neck of a dog such that a second end of said first strap is positioned on a back of the dog proximate to rear hips of the dog;
a first fastener coupled to a top face of said first strap adjacent to said first end;
a second fastener coupled to said top face of said first strap adjacent to said first fastener, said second fastener being complementary to said first fastener, wherein said first strap is configured for loopedly positioning around the collar of the dog, wherein said first fastener is positioned on said first strap such that said first fastener is positioned to couple to said second fastener such that said first strap is coupled at said first end to the collar, said first fastener and said second fastener comprising a first hook and loop fastener;
a first flap coupled to and extending from said first strap proximate to a midpoint of said first strap;
a second strap coupled to and extending from said first strap, said second strap being opposingly positioned to said first flap;
a first connector coupled to said first flap;
a second connector coupled to said second strap distal from said first strap, said second connector being complementary to said first connector, wherein said second strap is configured for loopedly positioning around a chest of the dog, wherein said first connector is positioned on said second strap such that said first connector is positioned to couple to said second connector such that said second strap is coupled to the dog, said first connector and said second connector comprising a second hook and loop fastener;
an adjuster coupled to said first strap, said adjuster being reversibly couplable to said first strap, wherein said adjuster is positioned on said first strap such that said adjuster is positioned to selectively couple to said first strap such that said first end of said first strap is selectively positionable relative to said second end of said first strap, said adjuster being positioned between said first flap and said first end of said first strap, said adjuster comprising a buckle;
a second flap coupled to said first strap and extending from said second end, said second flap being substantially rectangularly shaped;
a pair of first couplers coupled to said second flap, each said first coupler being positioned proximate to a respective opposing end of said second flap;
a pair of second couplers, each said second coupler being hingedly coupled to a respective said first coupler;
a cutout positioned in said second flap distal from said first strap, said cutout being equally distant from said opposing ends of said second flap, said cutout being arcuate, wherein said cutout is positioned in said second flap such that second flap is configured for conforming to the rear hips of the dog;
a third coupler coupled to said second flap, said third coupler being positioned between said cutout and said first strap;
a fourth coupler hingedly coupled to said third coupler;
a panel reversibly couplable to said second end of said first strap, said panel being flexible, wherein said panel is couplable to said harness such that said panel is positioned on the dog such that said panel is configured for collection of feces expelled by the dog, said panel being substantially rectangularly shaped;
a reservoir coupled to and positioned in said panel, wherein said reservoir is positioned in said panel such that said reservoir is configured for receiving feces excreted from the dog, said reservoir comprising an insert positioned in said panel, said insert being resilient, said insert being ovally shaped;
a pair of third straps coupled to said panel and extending singly from front corners of said panel, wherein said third straps are positioned on said panel such that said third straps are configured for loopedly positioning around a torso of the dog proximate to the rear hips;
a pair of first retainers, each said first retainer being coupled to an inside face of a respective said third strap distal from said panel, said first retainers being complementary to said first couplers, wherein said first retainers are positioned on said third straps such that said first retainers are positioned to couple to said first couplers to loopedly couple said third straps around the torso of the dog, each said first retainer and an associated said first coupler comprising a third hook and loop fastener;
a pair of third retainers, each said third retainer being coupled to an outside face of a respective said third strap distal from said panel, said third retainers being complementary to said second couplers, wherein said second couplers are positioned on said panel such that said second couplers are positioned to couple to said third retainers to couple said third straps to said panel, each said second coupler and an associated said third retainer comprising a fifth hook and loop fastener;
a pair of fourth straps coupled to said panel and extending singly from rear corners of said panel;
a pair of second retainers, each said second retainer being coupled to an upper face of a respective said fourth strap distal from said panel, said second retainers being complementary to said third coupler, a respective said second retainer and said third coupler comprising a fourth hook and loop fastener;
a pair of fourth retainers, each said fourth retainer being coupled to a lower face of a respective said fourth strap distal from said panel, said fourth retainers being complementary to said second retainers and said fourth coupler, wherein said third coupler is positioned on said panel such that said third coupler is positioned to selectively couple to a respective said second retainer to couple an associated said fourth strap across a rump of the dog to said panel, and wherein a respective said fourth retainer positioned on said respective said fourth strap is positioned to couple to a respective said second retainer positioned on a respective said fourth strap such that said fourth straps are crossedly configured around a tail of the dog, and wherein said respective said fourth retainer is positioned to couple to said fourth coupler to couple said fourth straps to said panel;
a guide coupled to and extending from said panel, said guide being substantially rigid, said guide being positioned equally distant from said rear corners of said panel, wherein said guide is positioned on said panel such that said guide is configured to direct feces to said reservoir, said guide comprising cardboard; and wherein said first fastener is positioned on said first strap such that said first fastener is positioned to couple to said second fastener such that said first strap is coupled at said first end to the collar, wherein said second strap is configured for loopedly positioning around the chest of the dog, wherein said first connector is positioned on said second strap such that said first connector is positioned to couple to said second connector such that said second strap is coupled to the dog, wherein said adjuster is positioned on said first strap such that said adjuster is positioned to selectively couple to said first strap such that said first end of said first strap is selectively positionable relative to said second end of said first strap, wherein said first retainers are positioned on said third straps such that said first retainers are positioned to couple to said first couplers to loopedly couple said third straps around the torso of the dog, wherein said second couplers are positioned on said panel such that said second couplers are positioned to couple to said third retainers to couple said third straps to said panel, wherein said third coupler is positioned on said panel such that said third coupler is positioned to selectively couple to a respective said second retainer to couple an associated said fourth strap across the rump of the dog to said panel, and wherein a respective said fourth retainer positioned on said respective said fourth strap is positioned to couple to a respective said second retainer positioned on a respective said fourth strap such that said fourth straps are crossedly configured around the tail of the dog, and wherein said respective said fourth retainer is positioned to couple to said fourth coupler to couple said fourth straps to said panel, such that said panel is positioned on the dog such that said panel is configured for collection of feces expelled by the dog, wherein said reservoir is positioned in said panel such that said reservoir is configured for receiving the feces excreted from the dog, and wherein said guide is positioned on said panel such that said guide is configured to direct the feces to said reservoir.

* * * * *